United States Patent
Mizuno

(10) Patent No.: US 7,733,753 B2
(45) Date of Patent: Jun. 8, 2010

(54) OPTICAL DISK DEVICE

(75) Inventor: Takao Mizuno, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 530 days.

(21) Appl. No.: 11/782,205

(22) Filed: Jul. 24, 2007

(65) Prior Publication Data

US 2008/0025174 A1 Jan. 31, 2008

(30) Foreign Application Priority Data

Jul. 28, 2006 (JP) ............................ 2006-206510

(51) Int. Cl.
*G11B 20/18* (2006.01)
(52) U.S. Cl. ............... 369/53.2; 369/53.22; 369/53.23; 369/53.27; 369/53.28; 369/53.35; 369/44.35; 369/53.14; 369/44.32
(58) Field of Classification Search ........................ None
See application file for complete search history.

(56) References Cited

U.S. PATENT DOCUMENTS 5,511,050 A * 4/1996 Matsumoto et al. ...... 369/44.23
6,711,117 B1 * 3/2004 Kanbe ......................... 720/701
2003/0039184 A1 * 2/2003 Hirashima et al. ........ 369/44.25
2003/0206508 A1 * 11/2003 Chen ........................ 369/53.14
2004/0037194 A1 * 2/2004 Pan .......................... 369/53.18
2007/0002712 A1 * 1/2007 Chen et al. ............... 369/53.41
2007/0211587 A1 * 9/2007 Kosaki .................... 369/44.29

FOREIGN PATENT DOCUMENTS

| JP | 2000182317 | 6/2000 |
|---|---|---|
| JP | 2004095079 | 3/2004 |
| JP | 2005310328 | 11/2005 |

* cited by examiner

*Primary Examiner*—Joseph H Feild
*Assistant Examiner*—Ifedayo Iluyomade
(74) *Attorney, Agent, or Firm*—Pillsbury Winthrop Shaw Pittman, LLP

(57) ABSTRACT

This optical disk device includes a pickup head, a spindle motor, a signal generation unit, a runout amount calculation unit, and an out of balance disk detection unit. The signal generation unit generates a tracking error signal. The runout amount calculation unit controls the rotational speed of the spindle motor to first and second disk rotational speeds, and obtains, at these rotational speeds, runout amounts TE1 and TE2 of a tracking error signal, and runout amounts FE1 and FE2 of a focus error signal. And an out of balance disk detection unit detects that this optical disk is an out of balance disk, if the absolute value of (TE2×FE2)/(TE1×FE1) is greater than or equal to a threshold value.

3 Claims, 3 Drawing Sheets

FIG.3

THIS DISK CANNOT BE RECORDED AT HIGH SPEED, BECAUSE IT IS OUT OF BALANCE.

OPTICAL DISK DEVICE

CROSS REFERENCE

This Nonprovisional application claims priority under 35 U.S.C. §119(a) on Patent Application No. 2006-206510 filed in Japan on Jul. 28, 2006, the entire contents of which are hereby incorporated by reference.

BACKGROUND OF THE INVENTION

Devices which record data upon optical disks (hereinafter simply termed "disks") are widespread nowadays. When data is recorded at high speed upon an optical disk whose center of gravity is displaced from its rotational center (hereinafter termed an "out of balance disk"), serious vibration occurs. Thus, with a disk recording device according to the prior art, for example with a DVD recording device, before performing recording upon a disk, a decision is made in advance as to whether or not this disk is an out of balance disk.

As one method for deciding whether or not a disk is out of balance, the method of providing a vibration sensor has been considered. Furthermore, a method of making this decision from the tracking error signal (hereinafter termed the "TE signal") which is used for performing detection for keeping the pickup upon a predetermined track of the disk, or from the focus error signal (hereinafter termed the "FE signal"), has been proposed (refer to Japanese Laid-Open Patent Publication 2000-182317, Japanese Laid-Open Patent Publication 2004-95079, Japanese Laid-Open Patent Publication 2005-310328, and so on). With this type of method of detecting the TE signal or the FE signal, a structure which is primarily required for keeping the pickup upon the predetermined track may be used. Accordingly, it is not necessary to provide any additional structure such as, for example, a vibration sensor, in order to detect whether or not a disk is out of balance. With prior art methods such as those disclosed in these patent documents of using the TE signal or the FE signal to decide whether or not a disk is out of balance, individual threshold values have been set separately for the TE signal and for the FE signal, and these threshold values have been used for making the decision as to whether or not the disk is out of balance.

In Japanese Laid-Open Patent Publication 2000-182317, there is disclosed a disk device which is endowed with an auto balancer function for corresponding to disk deflection. In this patent document the concept is described of, in order to decide whether or not to deploy the auto balancer function, detecting the TE signal and the FE signal, and comparing them separately with their individual threshold values. The auto balancer function does not manifest any advantageous effect below a certain stipulated rotational speed. On the other hand, when the disk is temporarily rotated at a high speed above the stipulated rotational speed, its advantageous effect is sustained even below the stipulated rotational speed. Accordingly, in this patent document, the concept is described of first detecting the TE signal and the FE signal during a process of raising the rotational speed to a high level, and subsequently detecting the TE signal and the FE signal while lowering the rotational speed to an intermediate level, thus sustaining the advantageous effect of the auto balancer.

In Japanese Laid-Open Patent Publication 2004-95079, the concept is described of deciding whether or not a disk is out of balance by using whether or not the slope of (the TE signal which is detected at some rotational speed (corresponding to the runout amount of the TE signal in the present application)) with respect to (disk rotational speed) is less than some threshold value.

And, in Japanese Laid-Open Patent Publication 2005-310328, there is disclosed an optical disk device which is equipped with a means for making a decision by comparing together the amplitude of TE (corresponding to the runout amount of the TE signal in the present application) in the state when tracking is ON and the amplitude of TE in the state when tracking is OFF, and for changing the recording speed based thereupon, and with a means for making a decision by comparing together the amplitude of the FE signal in the state when tracking is ON and the letter-S shaped amplitude of the FE signal obtained during starting, and for changing the recording speed based thereupon.

However, with methods such as those implemented in the above described prior art devices for deciding whether or not a disk is out of balance by using the TE signal and the FE signal, there has been the problem that the threshold values for the TE signal and the FE signal have each been set individually, so that it has been difficult to define a boundary line with the threshold values for deciding whether or not the disk is out of balance. In other words, since there is some directionality variation in the oscillation of the disk, if one only (or one at a time) of the runout amount of the TE signal, which indicates the amplitude of the error in the horizontal direction with respect to the track position, and the runout amount of the FE signal, which indicates the amplitude of the error in the vertical direction with respect to the track position, is compared with its threshold value, the relationship between these runout amounts and the amount by which the disk is out of balance (in concrete terms, the stability of the servos or the number of errors which are detected when recording or reading data) is not necessarily linear, so that there has been a problem of difficulty in definition of the boundary line in terms of the threshold values.

The present invention has been conceived of in order to solve this type of problem, and it takes as its object to provide an optical disk device which can accurately detect, using the TE signal and the FE signal, whether or not a disk is out of balance.

SUMMARY OF THE INVENTION

The optical disk device according to the present invention includes a pickup head, a spindle motor, a signal generation unit, a runout amount calculation means, and an out of balance disk detection means.

The pickup head irradiates laser light upon a disk which is loaded into a main body of said device, and detects light reflected from said disk.

The spindle motor rotates said disk.

The signal generation unit generates, from the reflected light from the disk which has been detected by said pickup head, a focus error signal which indicates the amount of deviation between the recording surface of said disk and the position of condensation of the laser light irradiated from said pickup head, and a tracking error signal which indicates the amount of deviation between the center of a track upon said disk and the irradiation position of the laser light irradiated from said pickup head.

The runout amount calculation means, along with controlling the rotational speed of said spindle motor to a first disk rotational speed and obtaining a runout amount TE1 of said tracking error signal and a runout amount FE1 of said focus error signal, also controls the rotational speed of said spindle motor to a second disk rotational speed which is higher than said first disk rotational speed and obtains a runout amount TE2 of said tracking error signal and a runout amount FE2 of said focus error signal.

And the out of balance disk detection means detects that said disk which is loaded is an out of balance disk, if an absolute value V2/V1 obtained by dividing a second servo runout amount V2 obtained by multiplying TE2 by FE2 by a first servo runout amount V1 obtained by multiplying TE1 by FE1 is greater than or equal to a first threshold value.

BRIEF DESCRIPTION OF THE DRAWINGS

FIG. 3 is an example of an output to be displayed when an out of balance condition is detected in accordance with an embodiment of the invention.

DETAILED DESCRIPTION OF THE INVENTION

In the following, an optical disk device which is an embodiment of the present invention will be explained in outline with reference to FIG. 1.

Figure 1:
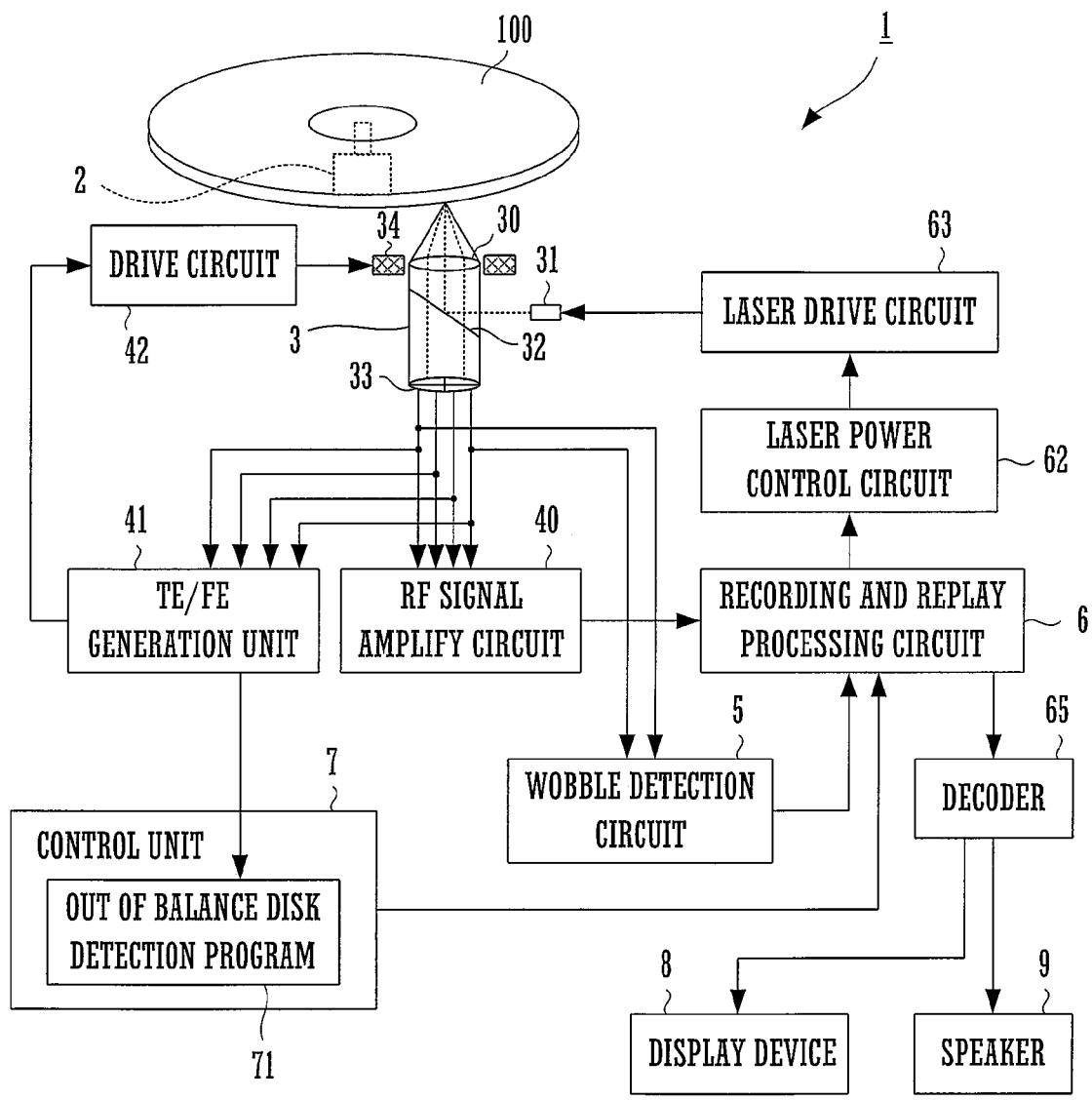
FIG. 1 is a block diagram showing the structure of an optical disk device according to an embodiment of the present invention.

FIG. 1 is a block diagram showing a portion of the structure of this optical disk device 1. This optical disk device 1 comprises a spindle motor 2, a pickup head 3 (hereinafter termed the "PU head 3"), a RF signal amplification circuit 40, a TE/FE generation unit 41, a drive circuit 42 for an actuator 32, a wobble detection circuit 5, a recording and replay processing circuit 6, a laser power control circuit 62, a laser drive circuit 63, a decoder 65, and a control unit 7.

The spindle motor 2 rotates the disk. The PU head 3 will now be explained. Just as in the case of a per se known disk device, this PU head 3 comprises a pickup lens 30, a laser diode 31, a beam splitter 32, a photodetector 33, a collimator lens not shown in the figures, and the like; and it irradiates a spot of laser light upon a DVD 100 and detects the light reflected therefrom.

Furthermore, the PU head 3 comprises two actuators 34. That is, it comprises a focusing actuator which shifts the focal point of the laser light irradiated upon the DVD 100 (i.e. the light spot) in the direction of its optical axis, and a tracking actuator which shifts said laser light in the radial direction of the DVD 100.

The beam splitter 32 separates the light emitted by the laser diode 31 and the light reflected by the DVD 100. The photodetector 33 is a light reception element divided into four portions, and detects the light reflected by the DVD 100. A collimator lens converts the light emitted by the laser diode 31, which is a light source, into parallel light.

The operation of the PU head 3 will now be explained. The laser diode 31 is driven by the laser drive circuit 63, and outputs laser light of a predetermined intensity. This laser light passes through the collimator lens and is reflected by the beam splitter 32, and is condensed upon the surface of the DVD 100 by the pickup lens 30. Furthermore, this laser light is reflected from the DVD 100, and this reflected light is detected by the four detectors of the photodetector 33, which output four respective detection signals. And the actuator 34 is driven by a drive circuit 42 which will be described hereinafter, thus tracking the laser light along the desired recording track.

The RF signal amplification circuit 40 will now be explained. This RF signal amplification circuit 40 adds together the four detection signals which have been detected by the photodetector 33 and amplifies the resulting RF signal. This RF signal is used for reading out data upon the DVD 100.

The TE/FE generation unit 41 will now be explained. This TE/FE generation unit 41 generates a tracking error signal TE and a focus error signal FE based upon the signal outputted from the photodetector 33, and outputs TE and FE to the drive circuit 42. Here, TE and FE are error signals for driving the actuator 34 for tracking the light spot along the predetermined track of the DVD 100, and they specify the errors of the tracking position in the horizontal and vertical directions respectively. Furthermore, when the control unit 7 is executing an out of balance disk detection program 71, the TE/FE generation unit 41 receives commands from the control unit 7, and generates TE and FE and outputs them to the control unit 7.

Here, the tracking error signal TE is an error signal which specifies the amount of deviation of the irradiation position of the spot of laser light irradiated from the pickup head 3 from the center of the track upon the DVD 100, and specifies the amount of deviation in the horizontal direction with respect to the DVD 100. And the focus error signal FE is an error signal which specifies the amount of deviation of the condensation position of the spot of laser light irradiated from the pickup head 3 from the recording surface of the DVD 100, and specifies the amount of deviation in the vertical direction with respect to the DVD 100.

The generation of the tracking error signal TE and the focus error signal FE by the TE/FE generation unit 41 may be performed according to a per se known method. For example, the focus error signal FE may be calculated by calculating $FE=(A+C)-(B+D)$, where the four detection signals from the photodetector 33 are A, B, C, and D, taken clockwise.

It should be understood that the photodetector 33 is not necessarily limited to being divided into four portions; it will be sufficient if it can obtain the amplitudes of the amounts of deviation in the horizontal direction and the vertical direction of the disk 100, while the disk 100 is rotating. For example, if a three-beam method is employed for detecting the tracking error, then it will be sufficient to divide the photodetector 33 into three light reception portions, since a secondary beam is irradiated upon both sides of the track direction of the disk 100. Furthermore, with a push-pull method, it will be sufficient to divide the photodetector 33 into two light reception surfaces.

The drive circuit 42 generates a signal for driving the actuator 34 based upon the signals TE and FE. The wobble detection circuit 5 will now be explained. This wobble detection circuit 5 receives input of a differential signal detected by the photodetector 33 of the PU head 3, and extracts a wobble signal therefrom. The wobble detection circuit 5 outputs this wobble signal to the recording and replay processing circuit 6. Here, the wobble is a meandering shape provided upon a guidance groove upon the DVD 100, and the wobble signal indicates the position of recording when recording data upon the disk. The wobble signal generates a clock signal for recording, and is used for controlling the rotational speed of the disk. Since a per se known circuit for wobble detection may be used for this wobble detection circuit 5, explanation thereof will here be omitted. Furthermore, as methods for controlling the rotational speed of the disk and the position for recording data, apart from wobble, the LPP (Land Pre-Pit) method and the like may also be employed. Such methods may also be used for control; the present invention is not limited to the use of wobble.

The recording and replay processing circuit 6, the laser power control circuit 62, the laser drive circuit 63, and the decoder 65 will now be explained. The recording and replay circuit 6 detects, from the RF signal, change of the reflectivity of the data recording surface of the DVD 100 due to the recording track. During replay, the recording and replay processing circuit 6 performs digitization upon the data outputted from the RF signal amplification circuit 40, according to the presence or absence of a recorded track upon the DVD 100. By doing this, reading out of the data which is recorded upon the DVD 100 is performed. A per se conventional circuit structure for data replay may be used for this replay circuit. Furthermore, the recording and replay processing circuit 6 is endowed with a function of, upon command from the control unit 7, outputting an OSD (On-Screen Display) consisting of characters and/or images to a display device 8, and displays various states of the optical disk device 1.

The laser power control circuit 62 controls the intensity of the laser. And the laser drive circuit 63 outputs a drive electrical current to the laser diode 31. When recording data upon the DVD 100, the laser drive circuit 63 controls the output electrical current of the laser drive circuit 63 so as to supply to the laser diode 31 an appropriate signal for driving it at the required intensity for data recording and deletion. And, during data read-out, the laser drive circuit 63 controls the output electrical current of the laser drive circuit 63 so as to supply to the laser diode 31 a drive signal which is weaker than during recording. Moreover, the decoder 65 decodes the RF signal which has been processed by the recording and replay processing circuit 6 into a replay signal. Furthermore, it outputs an image signal to the display device 8 via a D/A converter not shown in the figures. However, if this image signal is outputted to a display device which is provided with digital input and output terminals, then it is not necessary to pass the signal through a D/A converter.

The control unit 7 will now be explained. This control unit 7 comprises a microcomputer (including a CPU, RAM, ROM, and the like) not shown in the figures, or a system IC which includes such a microcomputer, and it performs various types of signal processing. The control unit 7 controls the various sections of the optical disk device 1, such as the drive unit for the spindle motor 2, the laser power control circuit 62, the RF signal amplification circuit 40, the TE/FE generation unit 41, the wobble detection circuit 5, and so on. Furthermore, an out of balance disk detection program 71 for deciding whether or not the DVD 100 is an out of balance disk is stored in a ROM of the control unit 7. When a DVD 100 is loaded into the optical disk device 1, the control unit 7 calls up and executes this program. Or it would also be acceptable to call up and execute this program when recording upon or reading out from a DVD 100 has been requested.

The display device 8 and a speaker 9 are both external to the optical disk device 1, and they output video and audio based upon the image signal which is generated by the recording and replay processing circuit 6. It would also be acceptable for the speaker 9 to be integrated with the display device 8.

It should be understood that although, in the above explanation of FIG. 1, the functions have been explained as being separated into blocks, in an actual implementation, it would be acceptable to combine together any or all of this plurality of functions upon a system IC; and it would also be acceptable to provide a structure in which the function of any of these blocks is subdivided into a plurality of sub-blocks.

Explanation of the Out of Balance Disk Detection Processing

Figure 2:
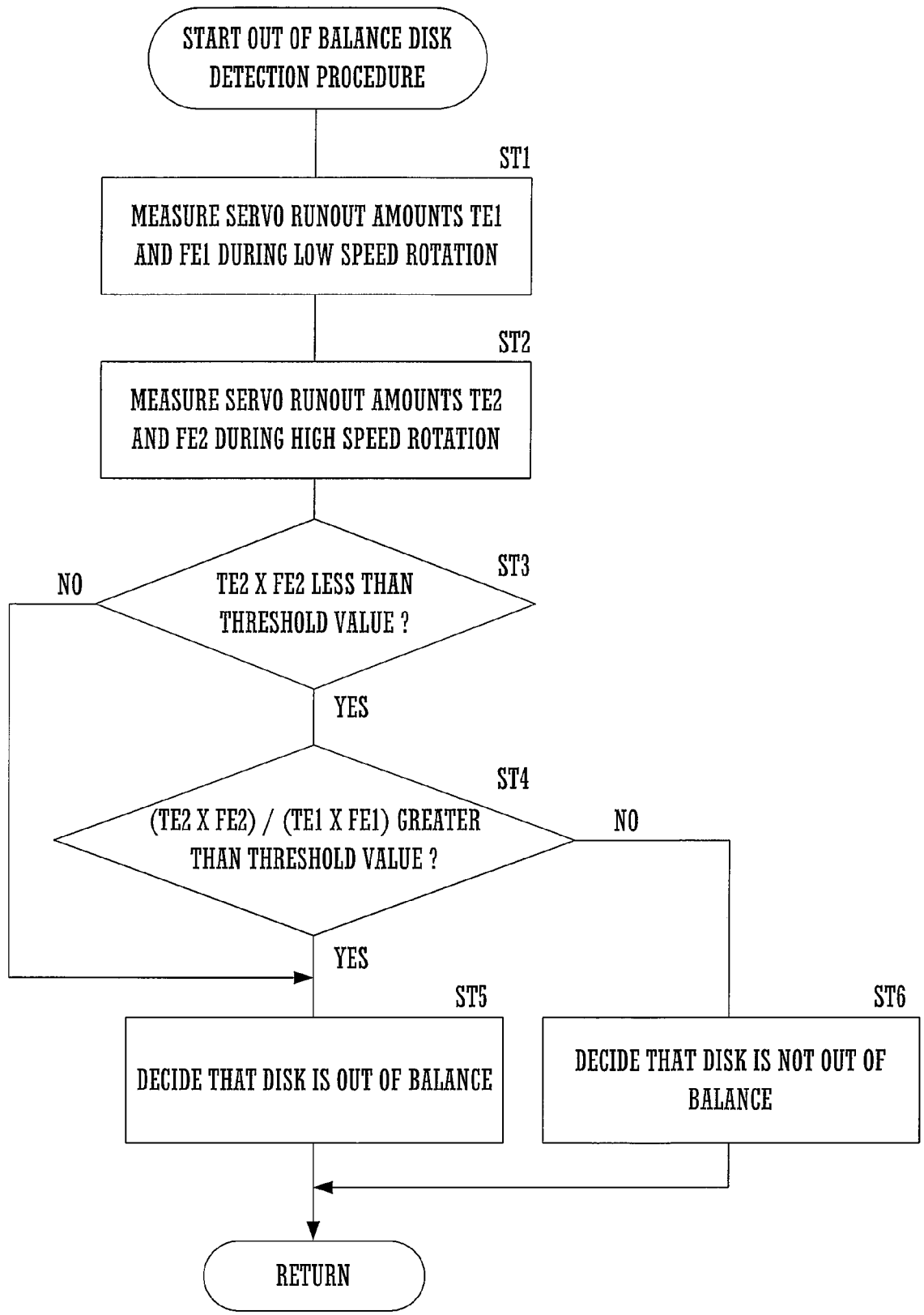
FIG. 2 is a flow chart showing the flow of out of balance disk detection in the optical disk device according to this embodiment.

Next, the flow of processing during the out of balance disk detection procedure which is performed by the control unit 7 executing the out of balance disk detection program 71 will be explained with reference to FIG. 2.

ST1: The rotational speed of the spindle motor 2 is controlled to a low rotational speed, for example to 3000 rpm, and, while tracking a predetermined track, the runout amount of the FE signal (termed FE1) and the runout amount of the TE signal (termed TE1) are measured. With regard to the position upon the DVD 100 which is tracked, since it is necessary to deal, not only with a DVD for which the linear speed must be kept constant, but also with a DVD for which the rotational speed must be kept constant, accordingly it is desirable for a track near the internal circumferential edge of the disk to be tracked. The runout amount of the FE signal and the runout amount of the TE signal may each be obtained by measuring the amplitude of the runout amount during one revolution. Or, alternatively, it would also be acceptable to measure each of these during a plurality of revolutions, and to take the average of these values.

ST2: The rotational speed of the spindle motor 2 is controlled to a high rotational speed, for example to 6000 rpm, and, while tracking a predetermined track, in the same manner as during the step ST1, the runout amount of the FE signal (termed FE2) and the runout amount of the TE signal (termed TE2) are measured.

ST3: A decision is made as to whether or not the value obtained by multiplying together TE2 and FE2 (termed the servo runout amount V2) is less than a threshold value D1. If V2 is less than the threshold value D1 (YES in the step ST3), then the flow of control is transferred to a step ST4. But if V2 is greater than or equal to the threshold value D1 (NO in the step ST3), then the flow of control is transferred to a step ST5, and, since it has been decided directly that the disk is one which is out of balance, a decision result to this effect is returned without further ado. The product of TE2 and FE2 which is calculated in this step ST3 is a value which indicates the area of the error range of the relative position of the predetermined track and the pickup, as seen in the cross sectional direction of the disk (hereinafter termed the "runout area").

The reason that the servo runout amount V2 in ST3 is taken as an indication of the runout area, is because there is a variation in the directivity of the runout of the DVD 100 due to the individual disk. It is possible to obtain a more linear correspondence relationship between the degree by which the disk is out of balance (in concrete terms, during recording or reading of the disk, the stability of the servo or the number of errors which are detected) and the runout area, than in the case of the relationship with respect to either the runout component in the vertical direction, or the runout component in the horizontal direction. In other words, it is easier to draw a boundary line with a threshold value for deciding upon the degree by which the disk 100 is out of balance, in the case of comparing the runout area with the threshold value as an indication, than in the case of comparing either the runout component TE2 in the horizontal direction or the runout component FE2 in the vertical direction with a threshold value. Thus, in this step ST3, the servo runout amount is taken as being V2, and this runout area is taken as an indication.

ST4, ST5, ST6: The product of TE2 and FE2 (i.e. V2) is divided by the product of TE1 and FE1 (i.e. V1), and a decision is made as to whether or not this value V2/V1 is greater than or equal to another threshold value D2. If V2/V1 is greater than or equal to the threshold value D2 (YES in the step ST4), then the flow of control is transferred to the step ST5, a decision is made that this disk is one which out of balance, and a decision result to this effect is returned. However, if V2/V1 is less than the threshold value D2 (NO in the step ST4), then the flow of control is transferred to the step ST6, a decision is made that this disk is not one which out of balance, and a decision result to this effect is returned.

It should be understood that the reason for not only providing the step ST3 but the step ST4 as well, is as follows. I.e., if only the step ST3 were to be employed, so that only the servo runout amount V2 measured at a single rotational speed were used as an indication, then, in consideration of the fact that individual differences are introduced during the manufacture of the pickup 3 and so on, it would not be possible to absorb this variation, and it would be difficult to draw the boundary line of threshold value. Since, as in the step ST4, comparison with threshold values in proportion to a plurality of rotational speeds makes it possible to eliminate individual differences between the pickups 3, accordingly it is possible to draw the boundary line of threshold value more reliably. On the other hand, the reason for providing the step ST3 is that it is desirable to decide directly that this disk is one which is out of balance, if it is possible to decide that the servo runout amount V2 is clearly large as a preliminary test to the step ST4. However, as another embodiment of the present invention, it would also be possible for the decision of the step ST3 not to be provided, and it would still be possible to decide in an effective manner whether or not this disk is one which is out of balance.

It should be understood that, in the above explanation, although the terms "less than" and "greater than or equal to" have been used, it would also be acceptable to use, instead, the terms "less than or equal to" and "greater than". Either will be acceptable, provided that it is possible to make a comparison with the threshold value, and to make a decision based thereupon.

Since, as described above, the runout area and the increase ratio of the servo runout amount with respect to rotational speed are used, accordingly it is possible to draw the boundary line of threshold value in a more reliable manner than in the prior art, even if variations in the direction of the runout of disks (in the vertical direction or the horizontal direction) are present, or if individual variations are introduced during manufacture of the pickups 3. Accordingly, it is possible to detect whether or not the disk which has been loaded is an out of balance disk, with a greater accuracy than in the prior art. Furthermore, although in the above explanation the disk 100 was supposed to be a DVD, the present invention is not limited to application to the case of a DVD; it could be any type of optical disk.

Next, the processing after the flow shown in FIG. 2 will be explained. If the control unit 7 has detected that a DVD 100 is one which is out of balance, then, since the fear is high that, for this DVD 100 for which this fact has been detected, an instability will occur during recording upon it or reading from it, accordingly recording upon or reading from this DVD is performed while lowering the rotational speed. With regard to recording upon the DVD 100, while, in the case of a disk which is not an out of balance one, recording may be performed at a high speed multiple, for example at a speed of 4× (a rotational speed of the DVD 100 of around 6000 rpm), by contrast, in the case of an out of balance disk, recording should be performed at a speed which is a half of the above speed, i.e. at a speed of 2× (a rotational speed of the DVD 100 of around 3000 rpm). However, these rotational speeds may be set at the most suitable rotational speeds based upon the design of the optical disk device 1; they are not to be considered as being limited to the values specified above.

Furthermore, with regard to this type of out of balance disk, the possibility is high that recording and/or replay thereof at a high speed multiple cannot be performed. In this case, it is desirable to notify the user of this fact. As a method of notifying the user, for example, for the convenience of the user of the optical disk device, it would be acceptable to arrange for an OSD display to the effect that this disk cannot be recorded at high speed, because it is out of balance, such as that shown in FIG. 3, to be displayed upon the display unit 8 via the recording and replay processing circuit 6. Furthermore, it would also be acceptable to provide a voice warning to this effect from the speaker 9. Or it would also be acceptable to provide a liquid crystal display upon the main body of the optical disk device 1, in order to provide this notification to the user therefrom.

What is claimed is:

1. An optical disk device, comprising:
   a pickup head which irradiates laser light upon a disk which is loaded into a main body of said device, and detects light reflected from said disk;
   a spindle motor which rotates said disk;
   a signal generation unit which generates, from the reflected light from the disk which has been detected by said pickup head, a focus error signal which indicates the amount of deviation between the recording surface of said disk and the position of condensation of the laser light irradiated from said pickup head, and a tracking error signal which indicates the amount of deviation between the center of a track upon said disk and the irradiation position of the laser light irradiated from said pickup head;
   a runout amount calculation means which, along with controlling the rotational speed of said spindle motor to a first disk rotational speed and obtaining a runout amount TE1 of said tracking error signal and a runout amount FE1 of said focus error signal, also controls the rotational speed of said spindle motor to a second disk rotational speed which is higher than said first disk rotational speed and obtains a runout amount TE2 of said tracking error signal and a runout amount FE2 of said focus error signal; and
   an out of balance disk detection means which detects that said disk which is loaded is an out of balance disk, if an absolute value V2/V1 obtained by dividing a second servo runout amount V2 obtained by multiplying TE2 by FE2 by a first servo runout amount V1 obtained by multiplying TE1 by FE1 is greater than or equal to a first threshold value.

2. An optical disk device as described in claim 1, wherein said out of balance disk detection means further detects that said disk which is loaded is an out of balance disk, if the absolute value of V2 is greater than or equal to a second threshold value.

3. An optical disk device as described in claim 1, further comprising a notification means which, if said out of balance disk detection means has detected that said disk which is loaded is an out of balance disk, provides a notification to this effect.

* * * * *